US010436610B2

(12) United States Patent
Matsui et al.

(10) Patent No.: US 10,436,610 B2
(45) Date of Patent: Oct. 8, 2019

(54) OPERATION INPUT DETECTION DEVICE (71) Applicant: AISIN SEIKI KABUSHIKI KAISHA, Kariya-shi (JP)

(72) Inventors: Seika Matsui, Kariya (JP); Junya Nakamura, Kuwana (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 87 days.

(21) Appl. No.: 15/743,553

(22) PCT Filed: Jun. 29, 2016

(86) PCT No.: PCT/JP2016/069242
§ 371 (c)(1),
(2) Date: Jan. 10, 2018

(87) PCT Pub. No.: WO2017/022375
PCT Pub. Date: Feb. 9, 2017

(65) Prior Publication Data
US 2018/0202839 A1 Jul. 19, 2018

(30) Foreign Application Priority Data
Aug. 4, 2015 (JP) ................................. 2015-154580

(51) Int. Cl.
*G01D 5/24* (2006.01)
*E05B 83/18* (2014.01)
(Continued)

(52) U.S. Cl.
CPC ........... *G01D 5/2405* (2013.01); *B60R 25/31* (2013.01); *E05B 83/18* (2013.01); *E05F 15/611* (2015.01);
(Continued)

(58) Field of Classification Search
CPC ...................................................... B60R 25/31
See application file for complete search history.

(56) References Cited

U.S. PATENT DOCUMENTS

2005/0068712 A1* 3/2005 Schulz .................... E05B 81/78
361/287
2006/0214921 A1 9/2006 Takahashi et al.
(Continued)

FOREIGN PATENT DOCUMENTS

JP 11-38057 A 2/1999
JP 2006-50008 A 2/2006
(Continued)

OTHER PUBLICATIONS

International Search Report dated Sep. 13, 2016, in PCT/JP2016/069242 filed Jun. 29, 2016.
(Continued)

*Primary Examiner* — Clayton E. LaBalle
*Assistant Examiner* — Jas A Sanghera
(74) *Attorney, Agent, or Firm* — Oblon, McClelland, Maier & Neustadt, L.L.P.

(57) ABSTRACT

An operation input detection device includes an operation input detection unit, a change amount accumulation unit, a section variation amount calculating unit, and a noise determination unit. The operation input detection unit detects an operation input on an operation input unit based on a sensor output of a capacitance sensor. The change amount accumulation unit accumulates a change amount of the sensor output in a determination section. The change amount of the sensor output is a difference of a detection value of the sensor output detected as each sampling timing from a previous value of the sensor output. The section variation amount calculating unit calculates a section variation amount of the sensor output.

16 Claims, 9 Drawing Sheets (51) Int. Cl.
- *E05F 15/611* (2015.01)
- *E05F 15/75* (2015.01)
- *E05F 15/73* (2015.01)
- *B60R 25/31* (2013.01)
- E05B 81/00 (2014.01)
- B60R 25/24 (2013.01)

(52) U.S. Cl.
CPC .............. *E05F 15/73* (2015.01); *E05F 15/75* (2015.01); *G01D 5/24* (2013.01); *B60R 25/24* (2013.01); *E05B 81/00* (2013.01); *E05Y 2400/45* (2013.01); *E05Y 2400/852* (2013.01); *E05Y 2400/86* (2013.01); *E05Y 2900/532* (2013.01)

(56) References Cited

U.S. PATENT DOCUMENTS

| | | |
|---|---|---|
| 2008/0018604 A1 | 1/2008 | Paun et al. |
| 2010/0214112 A1 | 8/2010 | Ishihara et al. |
| 2014/0142815 A1 | 5/2014 | Hirota et al. |

FOREIGN PATENT DOCUMENTS

| | | |
|---|---|---|
| JP | 2007-221641 A | 8/2007 |
| JP | 2008-269642 A | 11/2008 |
| JP | 5106533 B2 | 12/2012 |

OTHER PUBLICATIONS

English translation of the International Preliminary Report on Patentability and Written Opinion dated Feb. 6, 2018 in PCT/JP2016/069242 filed Jun. 29, 2016.

* cited by examiner

Fig.6A
Change Frequency (Avoid Noise)

Fig.6B
Change Detection Threshold Value
(Make Determination Condition Stricter)

OPERATION INPUT DETECTION DEVICE

TECHNICAL FIELD

The present invention relates to an operation input detection device.

BACKGROUND ART

A known operation input detection device detects an operation input performed on an operation input unit, which is arranged on a vehicle surface, based on a sensor output of a capacitance sensor that changes when a detection subject moves toward and away from the operation input unit. For example, patent document 1 discloses a configuration that alloys a door of the vehicle to be locked and unlocked in a non-contact manner by detecting the hand of a user proximate to a door handle of the vehicle. This improves the convenience.

Further, in such a non-contact sensor device, external noise may be superposed on the sensor output. The sensor output on which the external noise is superposed may be erroneously recognized as the approach of a detection subject.

Patent document 2 describes an example of a method for separating external noise with the Fourier transform. This ensures high reliability without decreasing the detection sensitivity.

PRIOR ART DOCUMENT

Patent Documents

Patent Document 1: Japanese Patent No. 5106533
Patent Document 2: Japanese Laid-open Patent Publication No. 11-38057

SUMMARY OF THE INVENTION

Problems that are to be Solved by the Invention

However, the separation of external noise with the Fourier transform as described above requires an electronic control unit (microcomputer) that is capable of executing the vast amount of the resulting calculations at high speeds.

It is an object of the present invention to provide an operation input detection device that accurately detects an operation input while limiting increases in the calculation load.

Means for Solving the Problem

An operation input detection device that solves the above problem includes an operation input detection unit, a change amount accumulation unit, a section variation amount calculating unit, and a noise determination unit. The operation input detection unit detects an operation input performed on an operation input unit, which is arranged on a vehicle surface, based on a sensor output of a capacitance sensor that changes when a detection subject moves toward and away from the operation input unit. The change amount accumulation unit accumulates a change amount of the sensor output in a determination section during which sampling is performed for a predetermined number of times on the sensor output of the capacitance sensor. The change amount of the sensor output is a difference of a detection value of the sensor output detected at each sampling timing from a previous value of the sensor output. The section variation amount calculating unit calculates a section variation amount of the sensor output that is a difference of an initial value of the sensor output that is first detected in the determination section and a final value of the sensor output that is last detected in the determination section. The noise determination unit determines that external noise is superposed on the sensor output when a cumulative value of the change amount exceeds a first threshold value and a value obtained by dividing the cumulative value of the change amount by the section variation amount exceeds a second threshold value.

An operation input detection device that solves the above problem includes an operation input detection unit, a change amount accumulation unit, a section variation amount calculating unit, and a noise determination unit. The operation input detection unit detects an operation input performed on an operation input unit, which is arranged on a vehicle surface, based on a sensor output of a capacitance sensor that changes when a detection subject moves toward and away from the operation input unit. The change amount accumulation unit accumulates a change amount of the sensor output in a determination section during which sampling is performed for a predetermined number of times on the sensor output of the capacitance sensor. The change amount of the sensor output is a difference of a detection value of the sensor output detected at each sampling timing from a previous value of the sensor output. The section variation amount calculating unit calculates a section variation amount of the sensor output that is a difference of an initial value of the sensor output that is first detected in the determination section and a final value of the sensor output that is last detected in the determination section. The noise determination unit determines that external noise is superposed on the sensor output when a cumulative value of the change amount exceeds a first threshold value and the section variation amount is less than or equal to a second threshold value.

EMBODIMENTS OF THE INVENTION

One embodiment of an operation input detection device will now be described with reference to the drawings.

Figure 1:
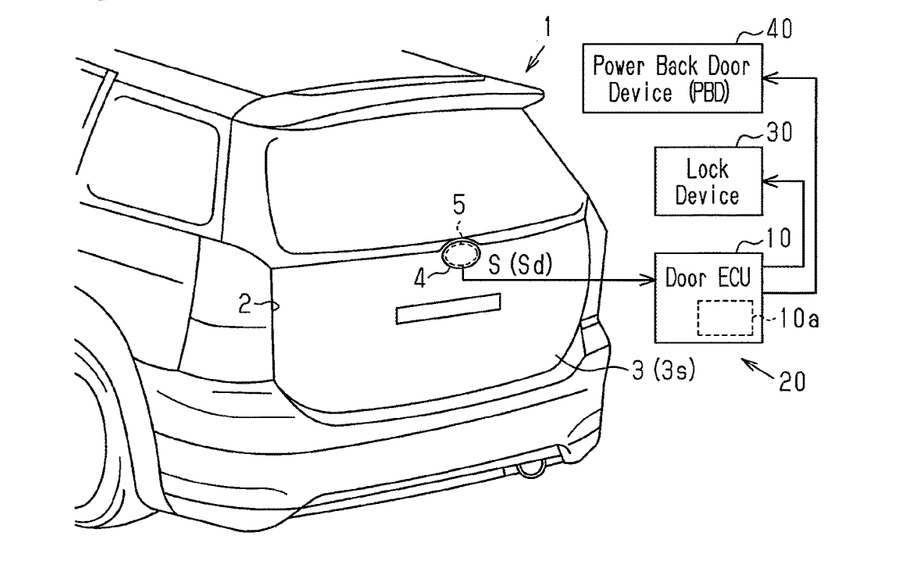
FIG. 1 is a schematic diagram showing an emblem switch arranged on a back door of a vehicle according to one embodiment of the present invention.

As shown in FIG. 1, a rear end of a vehicle 1 includes a door opening 2. A back door 3 that swings upward to open and close is arranged in the door opening 2. The back door 3 pivots about an upper end of the door opening 2. Further, the back door 3 includes an outer surface 3s provided with an emblem 4 of the vehicle 1. In the vehicle 1, the emblem 4 serves as an operation input unit used to open the back door 3.

Specifically, the present embodiment includes a capacitance sensor 5 located inside the emblem 4. Further, a door ECU receives a sensor output S (more specifically, detection value Sd of sensor output S) of the capacitance sensor 5. Thus, in the vehicle 1, the door ECU 10 functions as an operation input detection unit that detects an operation input performed on the emblem 4, which serves as the operation input unit. The door ECU 10 also serves as a change amount accumulation unit, a section variation amount calculating unit, a noise determination unit, a frequency changing unit, a determination condition changing unit, and an input detection prohibiting unit.

More specifically, the sensor output S of the capacitance sensor 5 changes when a detection subject moves toward and away from the emblem 4. In addition, the door ECU 10 detects, for example, a proximate operation input (such as "hand holding operation") performed on the emblem 4 based on the sensor output S of the capacitance sensor 5. Thus, the vehicle 1 includes an emblem switch 20 that serves as an operation input detection device.

In more detail, when the door ECU 10 detects an operation input performed on the emblem 4, for example, under the condition that the security requirements of an electronic key or the like are satisfied, the door ECU 10 opens a lock device 30 arranged in the back door 3. Further, the vehicle 1 includes a power back door device 40 (PSD) that uses a motor (not shown) as a drive source. The door ECU 10 controls actuation of the power back door device 40 to open the back door 3.

Figure 2:
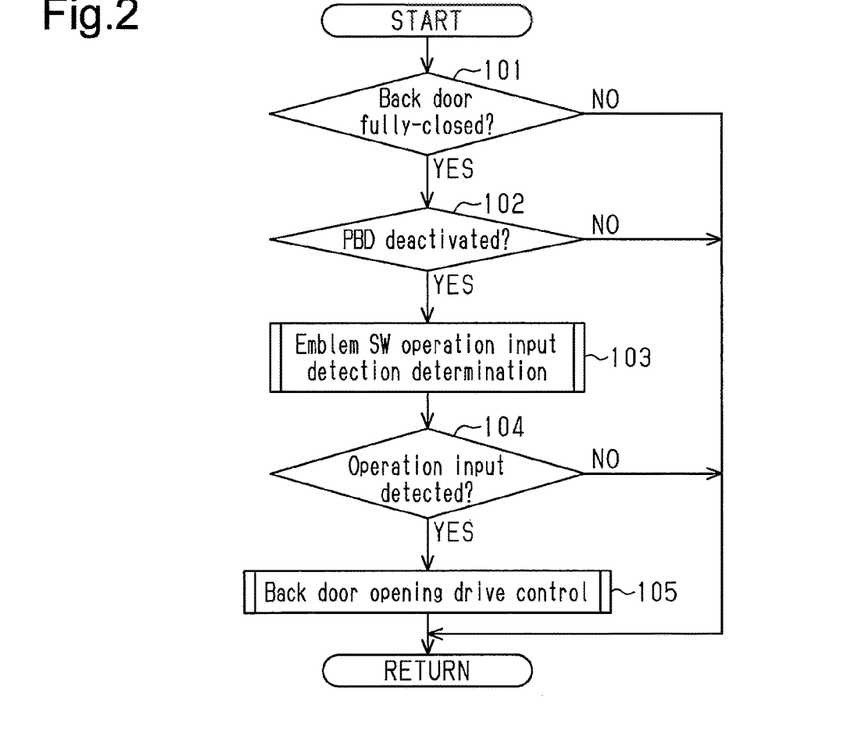
FIG. 2 is a flowchart showing the procedures for processing opening drive control of the back door using the emblem switch shown in FIG. 1.

Specifically, as shown in the flowchart of FIG. 2, when the back door is in a fully-closed state (step 101: YES) and the power back door device 40 is deactivated (step 102: YES), the door ECU 10 determines detection of an operation input performed on the emblem 4 (step 103). When the door ECU 10 detects an operation input performed on the emblem 4 (step 104: YES), the door ECU 10 performs opening drive control on the back door 3 (step 105).

Noise Determination of Capacitance Sensor

The noise determination of the capacitance sensor 5 performed by the door ECU 10 will now be described.

Figure 3A:
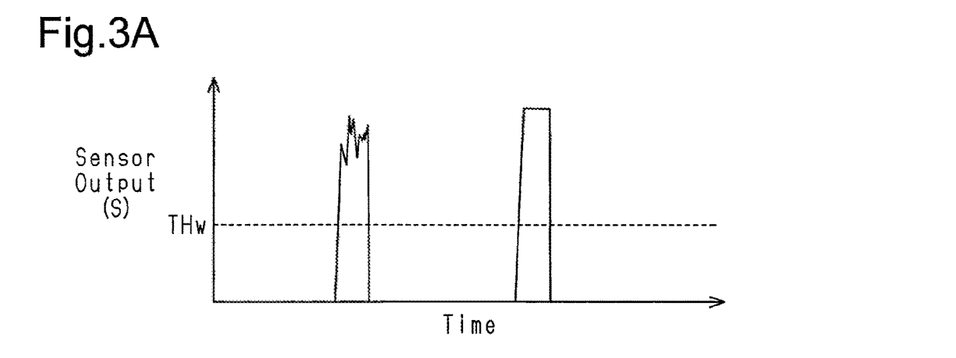
FIG. 3A is a graph showing a sensor output waveform when an operation input is performed.

As shown in FIG. 3A, in the emblem switch 20, when an operation input is performed on the emblem 4 serving as the operation input unit, the sensor output S of the capacitance sensor 5 rises when a detection subject (for example, hand of user) approaches. In FIG. 3A, the left waveform is produced by an approach operation, and the right waveform is produced by a touch operation. When the hand of the user that performs an operation input is in a still state, the sensor output S is maintained at a high value. Subsequently, when the hand of the user is separated from the emblem 4, the sensor output S steeply decreases.

Based on the characteristics of the sensor output S that changes in this manner, the door ECU 10 sets one condition for the operation input detection determination as the sensor output S being greater than a predetermined threshold value (wake-up threshold value THw). While the high sensor output remains greater than the wake-up threshold value THw, the door ECU 10 is configured to perform various types of condition determinations (for example, "raindrop detection determination" or "leaning detection determination") that increase the detection accuracy of the operation input detection.

Figure 3B:
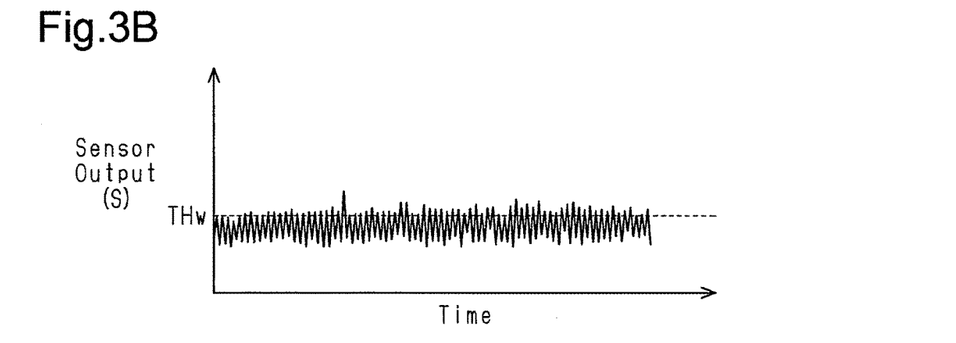
FIG. 3B is a graph showing a sensor output waveform on which external noise is superposed.

However, as shown in FIG. 3B, when external noise is superposed on the sensor output S of the capacitance sensor 5, the value of the sensor output S may exceed the wake-up threshold value THw such that the door ECU 10 erroneously recognizes such superposition of external noise as the approach of a detection subject.

In this regard, the door ECU 10 performs a noise determination of whether or not noise is superposed on the sensor output S of the capacitance sensor 5. When determined that noise is superposed on the sensor output S of the capacitance sensor 5, the door ECU 10 performs noise avoidance control (frequency change control) that avoids the superposition of the external noise and strict determination condition control (detection threshold value change control) that reduces the influence caused by the superposition of the external noise on the sensor output S.

Figure 4:
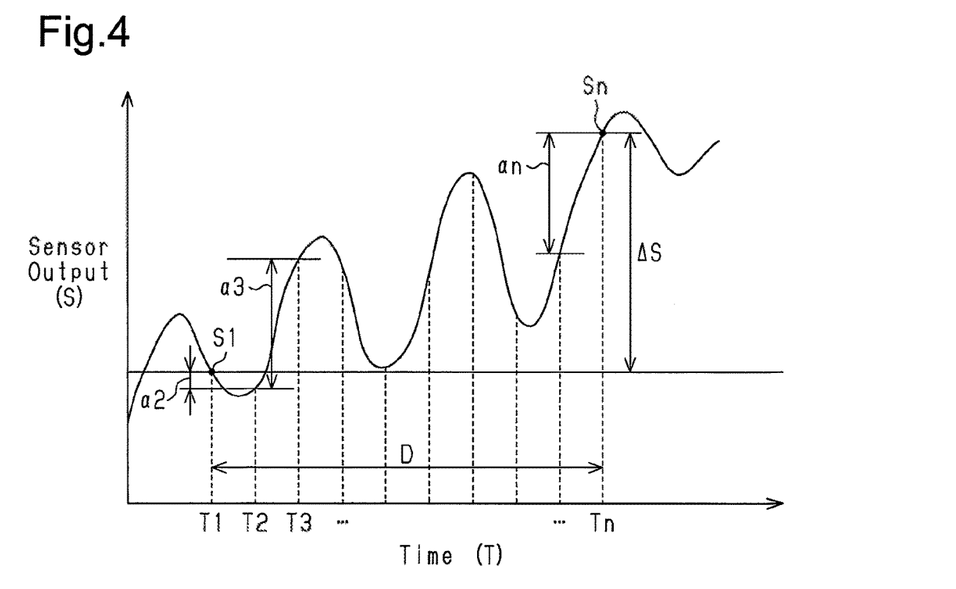
FIG. 4 is a diagram showing a noise determination performed by the door ECU shown in FIG. 1.

More specifically, as shown in FIG. 4, the door ECU 10 detects the sensor output S of the capacitance sensor 5 in a predetermined sampling cycle. Further, the door ECU 10 sets a section in which the sensor output S of the capacitance sensor 5 is sampled for a predetermined number of times (n times, for example, approximately ten times) as a single determination section D. In detail, the sensor output S is detected at sampling timings (T1, T2, ..., Tn) in the determination section D. The door ECU 10 serving as the change amount accumulation unit calculates a change amount $\alpha$ ($\alpha 1$, $\alpha 2$, ..., $\alpha n$) of the sensor output S. Each change amount $\alpha i$ (i=1, 2, ..., n) is the absolute value of the difference of a detection value Sd of the sensor output S at the sampling timing Ti from a previous value Sb ($\alpha i$=[Sd−Sb]). The door ECU 10 accumulates the change amount $\alpha$ ($\alpha 1$, $\alpha 2$ ..., $\alpha n$) of the sensor output S (cumulative value: SA=$\alpha 1$+$\alpha 2$+ ..., +$\alpha n$).

Further, the door ECU 10 serving as the section variation calculating unit obtains a section variation amount $\Delta S$ of the sensor output S in the determination section D by calculating the absolute value of the difference of an initial value S1 of the sensor output S that is first detected in the determination section D from a final value Sn of the sensor output S that is last detected in the determination section D ($\Delta S$=[Sn−S1]). In addition, the door ECU 10 serving as the noise determination unit determines that noise is superposed on the sensor output S when the cumulative value SA of the change amount $\alpha$ exceeds a predetermined threshold value TH1 and a value obtained by dividing the cumulative value SA of the change amount $\alpha$ by the section variation amount $\Delta S$ (change amount cumulative value section variation amount ratio: R=SA/$\Delta S$) exceeds a predetermined threshold value TH2.

More specifically, the sampling frequency of the sensor output S of the door ECU 10 is much faster than the frequency of an operation input action performed by the user (for example, movement of "hand" in still state, approximately 10 Hz). Thus, when external noise is not superposed on the sensor output S, differences are limited between the detection values Sd of the sampling timings.

In contrast, when external noise is superposed on the sensor output S, the detection value Sd is likely to differ at each sampling timing. This tendency is further prominent in the cumulative value SA of the change amount $\alpha$.

Further, even when external noise is not superposed, if the sensor output S rises in the determination section D when the hand of the user moves toward the emblem 4 serving as the operation input unit or if the sensor output S falls in the determination section D when the hand of the user moves away from the emblem 4 (refer to FIG. 3A), the cumulative value SA of the change amount $\alpha$ in the determination section D becomes large.

The section variation amount $\Delta S$ of the sensor output S in this case is a large value because of the rising waveform (and falling waveform), whereas the section variation amount $\Delta S$ of the sensor output S on which external noise is superposed tends to be a small value because of the variation amounts of the sensor output S from which it is calculated. Accordingly, when external noise is superposed on the sensor output S, the value obtained by dividing the cumulative value SA of the change amount $\alpha$ in the determination section D by the section variation amount $\Delta S$ of the sensor output S in the determination section p, that is, the change amount cumulative value section variation amount ratio R, also tends to be large. The door ECU 10 is configured to use such a tendency of the sensor output S on which such external noise is superposed to allow accurate noise determination to be performed while limiting increases in the calculation load.

Figure 5:
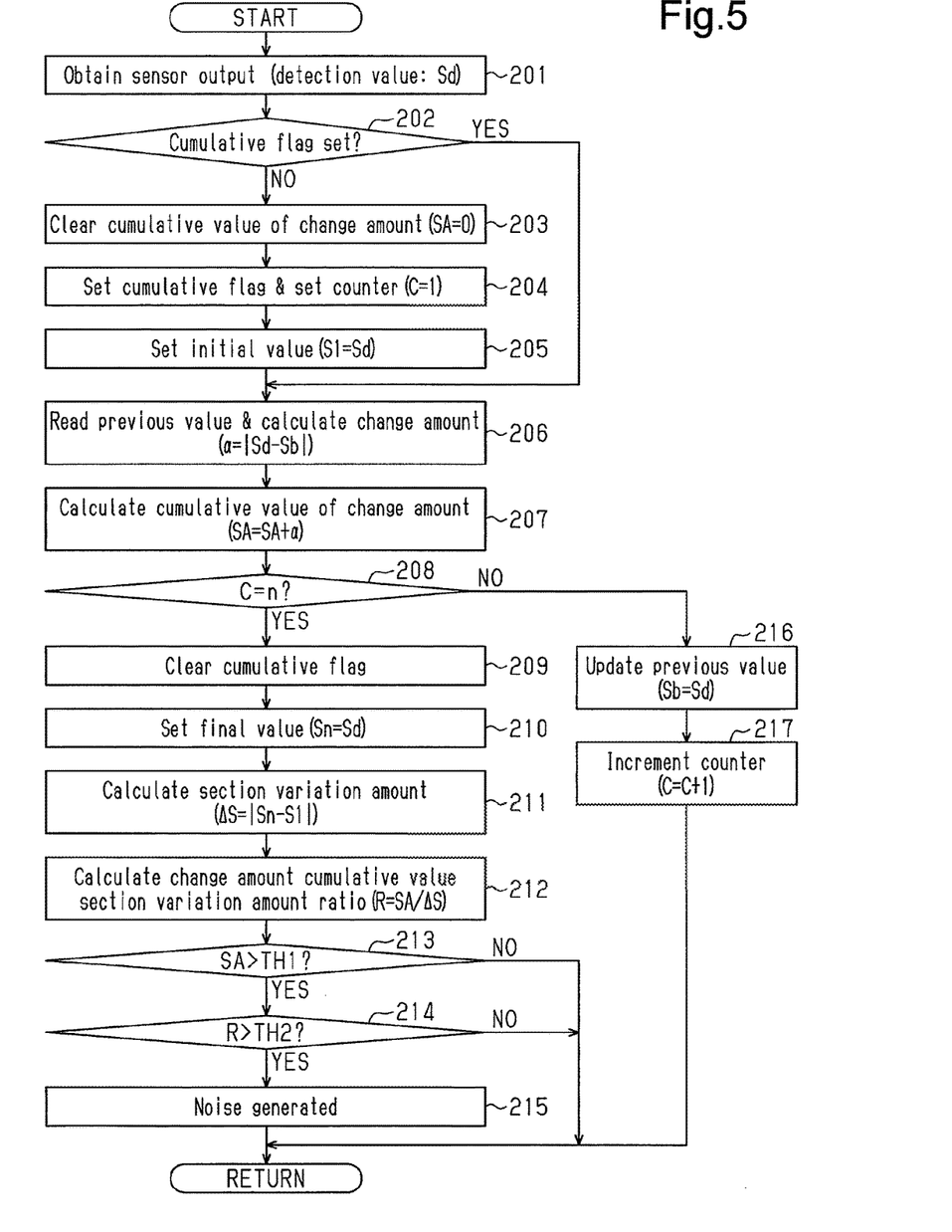
FIG. 5 is a flowchart showing the procedures of the noise determination performed by the door ECU shown in FIG. 1.

In more detail, as shown in the flowchart of FIG. 5, when the door ECU 10 obtains the sensor output S of the capacitance sensor 5 (detection value Sd, step 201), the door ECU 10 first determines whether or not a cumulative flag has been set (step 202). Then, in step 202, when the cumulative flag has not yet been set (step 202: NO), the door ECU 10 clears the cumulative value SA of the change amount $\alpha$ in the determination section D (SA=0, step 203). Additionally, the door ECU 10 sets the cumulative flag and sets a counter for measuring the number of samplings performed in the determination section D (C=1, step 204). Then, the door ECU 10 sets the detection value Sd of the sensor output S in the sampling cycle to the initial value S1 of the sensor output S in the determination section D (S1=Sd, step 205). In step 202, when the cumulative flag has been set (step 202: YES), the door ECU 10 does not execute the processes of steps 203 to 205.

Next, the door ECU 10 reads the previous value Sb of the sensor output S, which is stored in a storage region 10a (refer to FIG. 1) of the door ECU 10 and was detected in the previous sampling cycle, and calculates the change amount $\alpha$ ($\alpha$=|Sd−Sb|, step 206). Then, the door ECU 10 calculates the cumulative value SA of the change amount $\alpha$ in the determination section D (SA=SA+$\alpha$, step 207).

The door ECU 10 stores, in the storage region 10a, the cumulative value SA of the change amount $\alpha$ in the determination section D (including value being accumulated) together with the previous value Sb of the sensor output S and the initial value S1, which was set in step 205.

Subsequently, the door ECU 10 determines whether or not the count C of a sampling number measurement counter, which was set in step 204, has reached a predetermined number n that forms the determination section D (step 208). When the count C reaches the predetermined number n (C=n, step 208: YES), the door ECU 10 clears the cumulative flag (step 209). In addition, the door ECU 10 sets the detection value Sd of the sensor output S in the sampling cycle to the final value Sn of the sensor output S in the determination section D (Sn=Sd, step 210) and calculates the section variation amount $\Delta S$ ($\Delta S$=|Sn−S1|, step 211). Then, the door ECU 10 calculates the value obtained by dividing the cumulative value SA of the change amount $\alpha$ in the determination section D by the section variation amount $\Delta S$, that is, the change amount cumulative value section variation amount ratio R (R=SA/$\Delta S$, step 212).

Further, the door ECU 10 determines whether or not the cumulative value SA of the change amount $\alpha$ in the determination section D exceeds the predetermined threshold value TH1 (step 213) and determines whether or not the change amount cumulative value section variation amount ratio R exceeds the predetermined threshold value TH2 (step 214). When the section variation amount $\Delta S$ of the sensor output S exceeds the predetermined threshold value TH1 (SA>TH1, step 213: YES) and the change amount cumulative value section variation amount ratio R exceeds the predetermined threshold value TH2 (R>TH2, step 214: YES), the door ECU 10 determines that external noise is superposed on the sensor output S of the capacitance sensor 5.

In step 213, when the door ECU 10 determines that the cumulative value SA of the change amount $\alpha$ is less than or equal to the predetermined threshold value TH1 (SA≤TH1, step 213: NO) or the change amount cumulative value section variation amount ratio R is less than or equal to the predetermined threshold value TH2 (R≤TH2, step 214: NO), the door ECU 10 does not execute the process of step 215.

In addition, in step 208, when the door ECU 10 determines that the count C of the number of samplings has not reached the predetermined number n that forms the determination section D (C<n, step 208: NO), the door ECU 10 updates the previous value Sb of the sensor output S to the detection value Sd of the sensor output S in the present sampling cycle (Sb=Sd, step 216). Then, the door ECU 10 increments the sampling number measurement counter (C=C+1, step 217).

The door ECU 10 cyclically performs the noise determination illustrated in steps 201 to 217 at a timing synchronized with the sampling of the capacitance sensor 5. This allows for accurate determination of whether or not external noise is superposed on the sensor output S while limiting increases in calculation load.

Frequency Change Control and Detection Threshold Value Change Control During Noise Superposition The modes of the frequency change control and the detection threshold value change control performed by the door ECU 10 when noise is superposed on the sensor output will now be described.

Figure 6A:
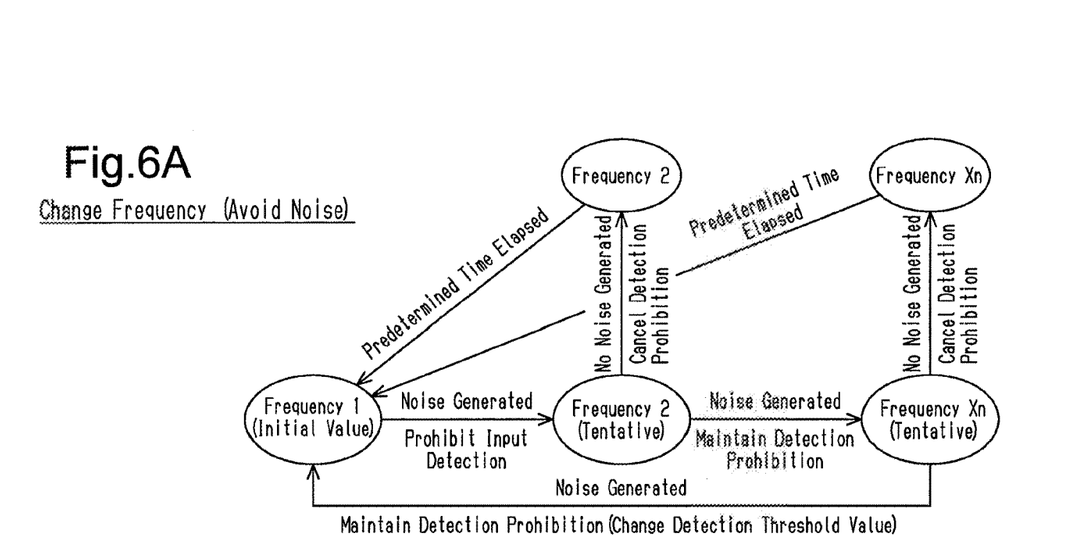
FIG. 6A is a state transition diagram showing modes of frequency change control performed by the door ECU shown in FIG. 1.
Figure 6B:
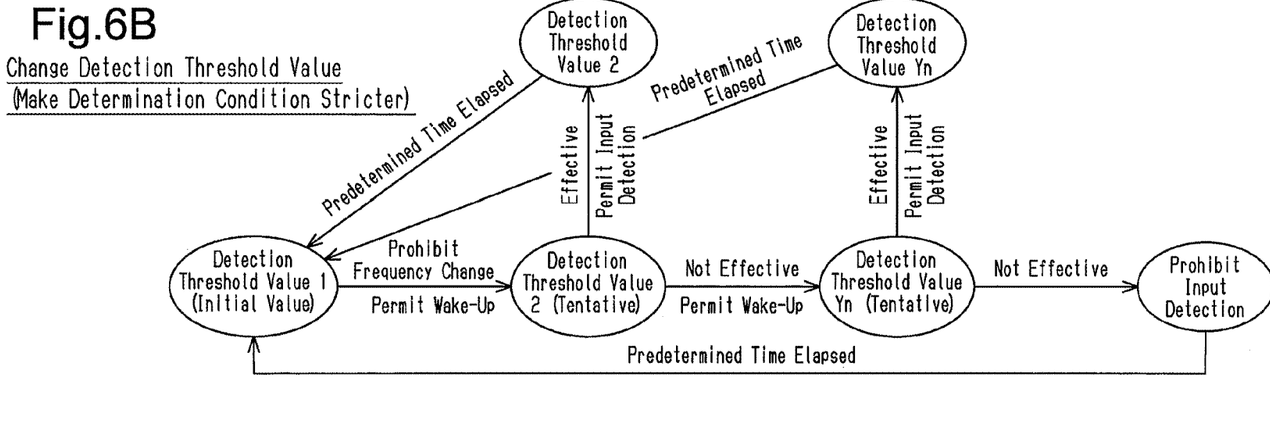
FIG. 6B is a state transition diagram showing modes of detection threshold value change control performed by the door ECU shown in FIG. 1.

As shown in FIGS. 6A and 6B, when the door ECU 10 determines that external noise has been superposed on the sensor output S of the capacitance sensor 5, the door ECU 10 prohibits the execution of operation input detection on the emblem 4 serving as the operation input unit (refer to FIG. 2, step 103). Then, the door ECU 10 executes the frequency change control that changes the sampling frequency of the capacitance sensor 5. Further, the door ECU 10 executes the detection threshold value change control that raises the detection threshold value for the operation input based on the sensor output of the capacitance sensor 5 in order so that the determination condition of the operation input detection becomes stricter.

More specifically, as shown in FIG. 6A, when external noise is superposed on the sensor output S of the capacitance sensor 5, the door ECU 10 serving as the frequency changing unit raises the sampling frequency in a state in which the operation input detection is prohibited. When the raising of the sampling frequency eliminates the external noise of the sensor output S, the door ECU 10 cancels the prohibition of the operation input detection while maintaining the changed sampling frequency.

In contrast, when the raising of the sampling frequency does not eliminate the external noise of the sensor output S, the door ECU 10 further raises the sampling frequency. When this eliminates the external noise of the sensor output S, the door ECU 10 cancels the prohibition of the operation input detection while maintaining the changed sampling frequency. When the external noise is not eliminated, the door ECU 10 further raises the sampling frequency.

When the external noise of the sensor output S is not eliminated, the door ECU 10 raises the sampling frequency in such a manner a predetermined number Xn (for example, approximately two times). If the external noise is not eliminated even when the sampling frequency is raised the predetermined number Xn, the door ECU 10 shifts to the detection threshold value change control while continuously prohibiting the operation input detection.

As shown in FIG. 6B, the door ECU 10 serving as the threshold value changing unit permits wake-up determination of the operation input detection when raising the detection threshold value of an operation input based on the sensor output of the capacitance sensor 5. In this case, the door ECU 10 determines whether or not it is effective to make the determination condition stricter by increasing the wake-up threshold value THw (refer to FIG. 3), which is set as the detection threshold value of the operation input.

More specifically, the door ECU 10 determines whether or not the raising of the detection threshold value reduces the number of wakeups resulting from external noise superposed on the sensor output S being erroneously recognized as the approach of a detection subject (for example, the number of times detection circuit (not shown) is activated). Thus, when the door ECU 10 determines that the raising of the detection threshold value is effective, the door ECU 10 permits the execution of the operation input detection using the raised detection threshold value.

In contrast, when the raising of the detection threshold value is not effective, the door ECU 10 further raises the detection threshold value. When the raising of the detection threshold value is effective, the door ECU 10 permits the execution of the operation input detection with the raised detection threshold value and raises the detection threshold value.

The door ECU 10 raises the detection threshold value in such a manner a predetermined number Yn (for example, approximately two times). When the raising of the detection threshold value by the predetermined number Yn is not effective, the door ECU 10 prohibits the execution of the operation input detection on the emblem 4 including the wake-up determination.

Figure 7:
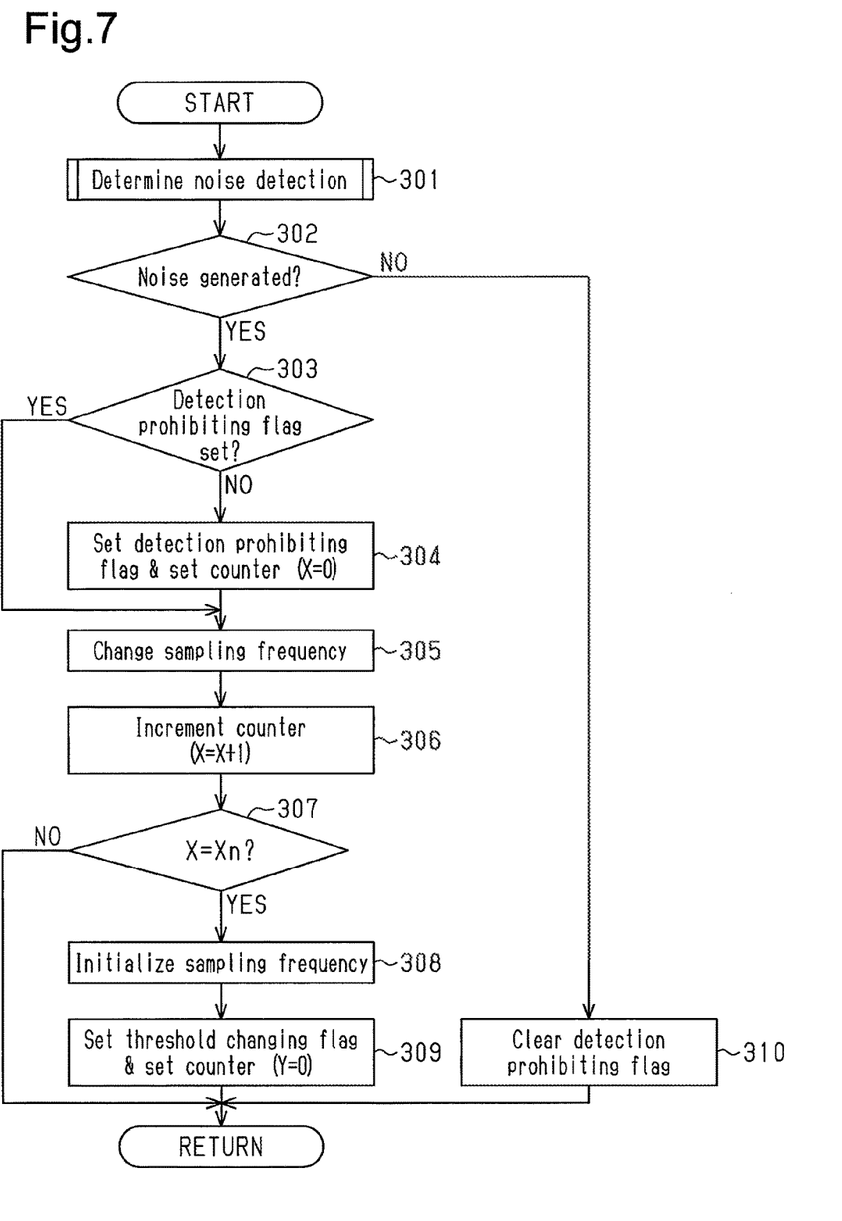
FIG. 7 is a flowchart showing the procedures of the frequency change control performed by the door ECU shown in FIG. 1.

More specifically, as shown in the flowchart of FIG. 7, when performing the noise detection determination (step 301), the door ECU 10 serving as the frequency changing unit determines whether or not the determination result indicates that external noise is superposed on the sensor output S of the capacitance sensor 5 (step 302). Further, when the determination result indicates superposition of the external noise (step 302: YES), the door ECU 10 subsequently determines whether or not a detection prohibiting flag has been set (step 303). When the detection prohibiting flag has not yet been set (step 303: NO), the door ECU 10 sets the detection prohibiting flag and sets a change number measurement counter (step 304). In step 303, when the detection prohibiting flag has been set (step 303: YES), the door ECU 10 does not execute the process of step 304.

Subsequently, the door ECU 10 changes the sampling frequency of the sensor output S of the capacitance sensor 5 (step 305) and increments the counter for measuring the number of changes (X=X+1, step 306). Then, the door ECU 10 determines whether or not the count X has reached the predetermined number Xn, which is set in advance (step 307). When the count X has reached the predetermined number Xn (step 307: YES), the door ECU 10 initializes the sampling frequency (step 308). Further, the door ECU 10 sets a threshold value changing flag and sets the change number measurement counter (Y=0, step 309).

The door ECU 10 holds, in the storage region 10a, a plurality of frequency bands corresponding to the maximum number of times (predetermined number Xn) the frequency change is performed. Further, in step 307, when the door ECU 10 determines that the count X of the number of changes has not reached the predetermined number Xn, which is set in advance (X<Xn, step 307: NO), the door ECU 10 does not execute the processes of steps 308 and 309. Further, in step 302, when the door ECU 10 determines that external noise is not superposed on the sensor output S of the capacitance sensor 5 (step 302: NO), the door ECU 10 clears the detection prohibiting flag without executing the processes of steps 303 to 309 (step 310).

More specifically, the door ECU 10 performs the frequency change control shown in steps 301 to 310 in predetermined calculation cycles. Thus, until reaching the limit of the predetermined number Xn, which is set in advance, the door ECU 10 repeatedly changes the sampling frequency of the capacitance sensor 5 while maintaining a state in which the detection prohibiting flag prohibits the operation input detection until external noise superposed on the sensor output S is eliminated (step 305). When the frequency change reaches the predetermined number Xn while the external noise remains superposed on the sensor output S (step 307: YES), the door ECU 10 initializes the detection threshold value change control without clearing the detection prohibiting flag (step 308 and step 309).

Figure 8:
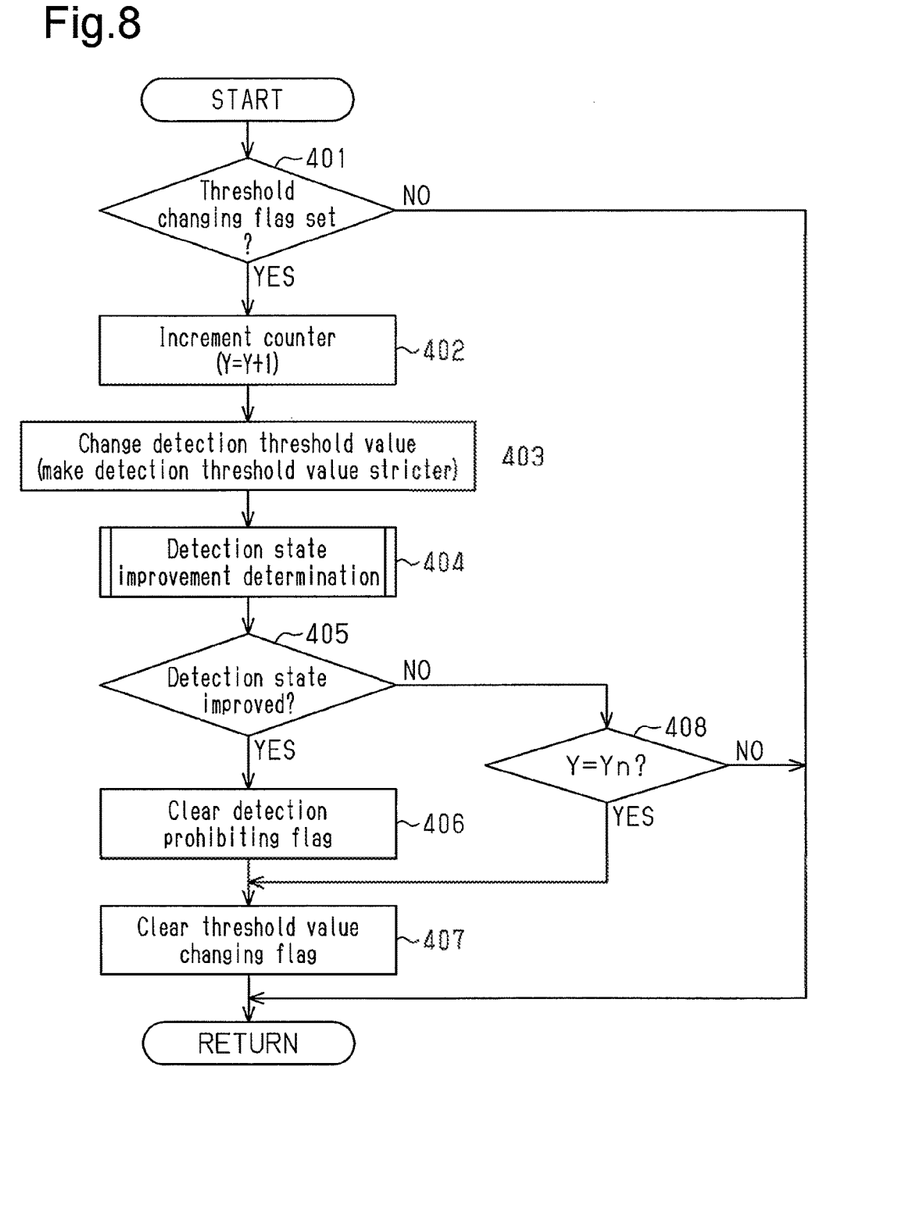
FIG. 8 is a flowchart showing the procedures of the detection threshold value change control performed by the door ECU shown in FIG. 1.

Further, as shown in the flowchart of FIG. 8, the door ECU 10 serving as the threshold value changing unit determines whether or not the threshold value changing flag has been set (step 401). When the threshold value changing flag has been set (step 401: YES), the door ECU 10 increments the change number measurement counter related to the detection threshold value (Y=Y+1, step 402). In addition, in order to make the determination condition of the operation input detection stricter, the door ECU 10 raises the wake-up threshold value THw (refer to FIG. 3), which is set as the detection threshold value of the operation input (step 403). Then, the door ECU 10 performs a detection state improvement determination that confirms whether or not the change in the detection threshold value is effective (step 404).

Specifically, within a predetermined time t0, when the number of wake-ups, which result from erroneous recognition of the external noise superposed on the sensor output S as the approach of a detection subject, is less than or equal to a predetermined number x0, the door ECU 10 determines that the change in the detection threshold value is effective.

Figure 9:
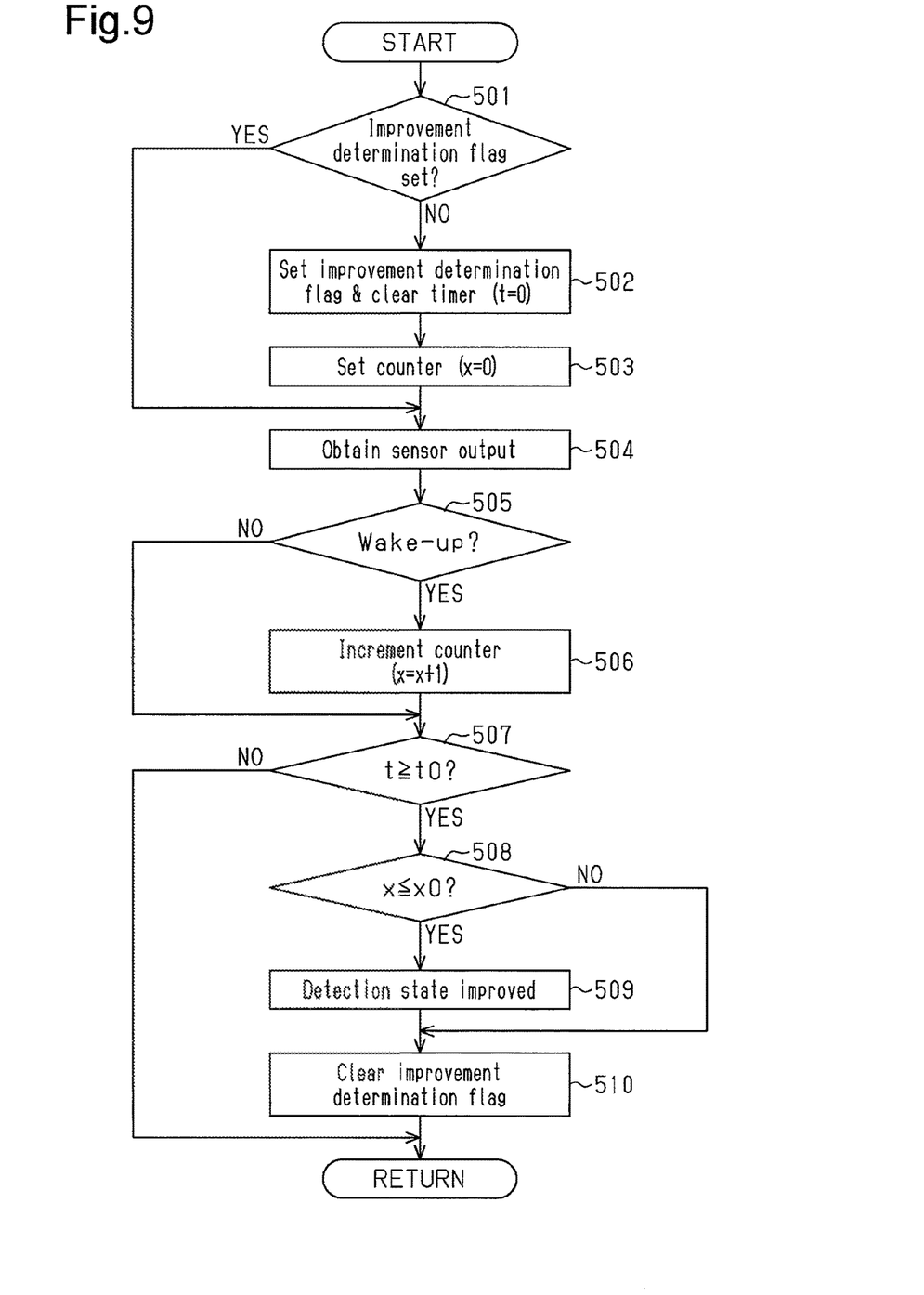
FIG. 9 is a flowchart showing the procedures of a detection state improvement determination performed by the door ECU shown in FIG. 1.

More specifically, as shown in the flowchart of FIG. 9, the door ECU 10 serving as a detection state improvement determination unit first determines whether or not an improvement determination flag has been set (step 501). When the improvement determination flag has not yet been set in step 501 (step 501: NO), the door ECU 10 sets the improvement determination flag and clears a timer that measures the predetermined time t0 (t=0, step 502). Then, the door ECU 10 sets a wake-up occurrence measurement counter related to the predetermined time t0 (x=0, step 503). In step 501, when the improvement determination flag has been set (step S01: YES), the door ECU 10 does not execute the processes of steps 502 and step 503.

Next, the door ECU 10 obtains the sensor output S of the capacitance sensor 5 (step 504) and determines whether or not the sensor output S (more specifically, detection value Sd of sensor output S) will result in a wake-up, for example, whether or not a detection circuit (not shown) will be activated (step 505). When the sensor output S will result in a wake-up (S>THw, step 505: YES), the door ECU 10 increments the wake-up occurrence measurement counter (x=x+1, step 506).

The wakeup determination in step 505 is performed by determining whether or not the sensor output S exceeds the wake-up threshold value THw (refer to FIG. 3). In step 505, when the door ECU 10 determines that the sensor output S will not result in a wake-up (step 505: NO), the door ECU 10 does not execute the process of step 506.

Further, the door ECU 10 determines whether or not an elapsed time t from when the improvement determination flag in step 502 was set, that is, from when the detection state improvement determination started, has reached the predetermined time t0 (step 50). In addition, when the door ECU 10 determines that the elapsed time t has reached the predetermined time t0 in step 507 (step 507: YES), the door ECU 10 determines whether or not the count x of the number of wake-ups that occurred is less than or equal to a predetermined number of times x0, which is set in advance (step 508). When the count x of the number of wake-ups that occurred is less than or equal to the predetermined number of times x0 (x≤x0, step 508), the door ECU 10 determines that there was improvement in the state of the operation input detection based on the sensor output S on which the external noise is superposed. That is, the door ECU 10 determines that the change in the detection threshold value is effective (step 509) and clears the improvement determination flag (step 510).

In step 508, when the count x of the number of times wake-ups that occurred exceeds the predetermined number x0 (x>x0, step 508: NO), the door ECU 10 clears the improvement determination flag in step 510 without executing the process of step 509. In step 507, when the door ECU 10 determines that the elapsed time t from when the detection state improvement determination started has not reached the predetermined time t0 (step 507: NO), the door ECU 10 does not execute the processes or steps 508 to 510.

As shown in FIG. 8, when the door ECU 10 performs the detection state improvement determination of step 404 through such procedures, the door ECU 10 then determines whether or not the determination result indicates improvement of the detected state (step 405). When the determination result indicates improvement of the detected state (step 405: YES), the door ECU 10 clears the detection prohibiting flag (step 406) and clears the threshold value changing flag (step 407).

In step 405, when the result of the detection state improvement determination does not indicate improvement of the detected state (step 405: NO), the door ECU 10 then determines whether or not the count Y of the number of times the detection threshold value has been changed has reached the predetermined number Yn, which is set in advance (step 408). When the count has reached the predetermined number Yn (Y=Yn, step 408: YES), the door ECU 10 clears the threshold value changing flag in step 407 without executing step 406.

In step 408, when the count Y of the number of times the detection threshold value has changed has not reached the predetermined number Yn, which is set in advance (Y<Yn, step 408: NO), the door ECU 10 does not execute the processes of steps 406 and 407. In step 401, when the threshold value changing flag has not been set (step 401: NO), the door ECU 10 does not execute the processes subsequent to step 402.

More specifically, the door ECU 10 performs the detection threshold value change control shown in steps 401 to 408 in predetermined calculation cycles. Thus, until reaching the limit of the predetermined number Yn, which is set in advance, the door ECU 10 repeatedly changes the detection threshold value in order to make the determination condition of the operation input detection stricter while maintaining the state in which the detection prohibiting flag prohibits the operation input detection until the detection threshold value change control is determined as being effective (step 403). When the detection threshold value change reaches the predetermined number of times Yn while the detected state remains unimproved (step 408: YES), the door ECU 10 maintains the state in which the detection prohibiting flag prohibits the operation input detection (refer to FIG. 6B) until a predetermined time Z0 elapses from when the detection prohibiting flag was set (refer to FIG. 7, step 304).

Figure 10:
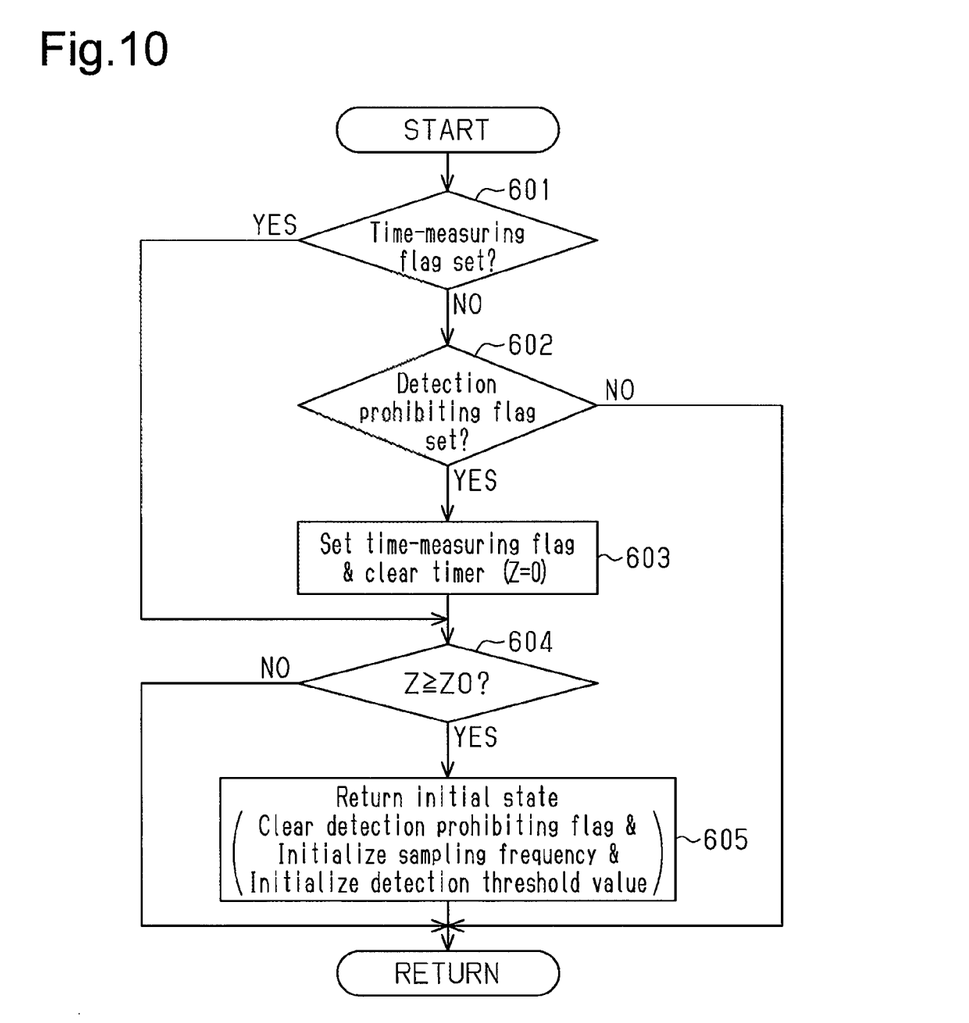
FIG. 10 is a flowchart showing the procedures of temporal cancellation control performed by the door ECU shown in FIG. 1.

In detail, as shown in the flowchart of FIG. 10, the door ECU 10 serving as a temporal cancelation control unit determines whether or not a time-measuring flag has been set (step 601). When the time-measuring flag has not been set (step 601: NO), the door ECU 10 then determines whether or not the detection prohibiting flag has been set (step 602). When the detection prohibiting flag has been set (step 602: YES), the door ECU 10 sets the time-measuring flag and clears a timer that measures an elapsed time Z from when the detection prohibiting flag was set (Z=0, step 603). In step 601, when the time-measuring has been set (step 601: YES), the door ECU 10 does not execute the processes of steps 602 and 603.

Subsequently, the door ECU 10 determines whether or not the elapsed time Z from when the detection prohibiting flag was set has reached the predetermined time Z0 (step 604). When the door ECU 10 determines that the elapsed time Z has reached the predetermined time Z0 (step 604: YES), the door ECU 10 returns the various conditions of the operation input detection, including the clearing of the detection prohibiting flag, to the initial state (step 605).

More specifically, in step 605, the door ECU 10 initializes the sampling frequency that was raised in the frequency change control (refer to FIGS. 6A and 7). The door ECU 10 initializes the detection threshold value that was raised in the detection threshold value change control (refer to FIGS. 6B and 8).

In step 604, when the elapsed time Z from when the detection prohibiting flag was set has not reached the predetermined time Z0 (step 604: NO), the door ECU 10 does not execute the process of step 605. In step 602, when the detection prohibiting flag has not been set (step 602: NO), the door ECU 10 does not execute the processes of steps 603 to 605.

More specifically, the door ECU 10 performs the temporal cancelation control shown in steps 601 to 605 in predetermined calculation cycles. Thus, even if the operation input detection remains prohibited because of the difficulty to ensure the reliability after performing the frequency change control and the detection threshold change control, the noise detection determination is performed again on the emblem switch 20 when the elapsed time Z has reached the predetermined time Z0.

Further, as shown in FIG. 6A, even when the sampling frequency is maintained after being changed by the execution of the frequency change control to cancel the prohibition of the operation input detection, the sampling frequency is initialized when the elapsed time Z reaches the predetermined time Z0. Additionally, as shown in FIG. 6B, even if the execution of the operation input detection is permitted using the detection threshold value changed by the execution of the detection threshold value change control, the detection threshold value is initialized in the same manner when the elapsed time Z reaches the predetermined time Z0. In this case, the noise detection determination is performed again.

The present embodiment has the advantages described below.

(1) The door ECU 10 serving as the change amount accumulation unit accumulates the change amount $\alpha$ of the sensor output S (cumulative value SA), which is the absolute value of the difference of the detection value Sd from the previous value Sb ($|Sd-Sb|$) of the sensor output S detected at each sampling timing, during a single determination section D in which sampling is performed on the sensor output S of the capacitance sensor 5 for a predetermined number of times. Further, the door ECU 10 serving as the section variation amount calculating unit obtains the section variation amount $\Delta S$ of the sensor output S in the determination section D by calculating the absolute value of the difference of the initial value S1 of the sensor output S that is first detected in the determination section D from the final value Sn of the sensor output S that is last detected in the determination section D ($\Delta S=|Sn-S1|$). In addition, the door ECU 10 serving as the noise determination unit determines that noise is superposed on the sensor output S when the cumulative value SA of the change amount $\alpha$ exceeds the predetermined threshold value TH1 and the value obtained by dividing the cumulative value SA of the change amount $\alpha$ by the section variation amount $\Delta S$ (change amount cumulative value section variation amount ratio: $R=SA/\Delta S$) exceeds the predetermined threshold value TH2.

More specifically, when external noise is not superposed on the sensor output S, differences in the detection value Sd at each sampling timing are limited. In contrast, when external noise is superposed on the sensor output S, the detection value Sd at each sampling timing is likely to differ. This tendency is further prominent in the cumulative value SA of the change amount $\alpha$. Additionally, in the determination section D, if the sensor output S rises or falls when an approach operation input is performed, the section variation amount becomes large as shown by the rising waveform or the falling waveform. In contrast, the section variation amount $\Delta S$ of the sensor output S on which external noise is superposed tends to become small depending on the variation amount of the sensor output S, which is based on the section variation amount $\Delta S$ of the sensor output S. Accordingly, when external noise is superposed on the sensor output S, the value obtained by dividing the cumulative value SA of the change amount $\alpha$ in the determination section D by the section variation amount $\Delta S$ of the sensor output S (change amount cumulative value section variation amount ratio R) tends to become large. Thus, the above configuration accurately determines whether or not external noise is superposed on the sensor output S of the capacitance sensor 5 while limiting increases in the calculation load. This ensures the accuracy of the operation input detection.

(2) When the door ECU 10 serving as the input detection prohibiting unit determines that external noise is superposed on the sensor output S of the capacitance sensor 5, the door ECU 10 prohibits the execution of operation input detection on the emblem 4, which serves as the operation input unit. This avoids the occurrence of erroneous recognition caused by external noise and ensures the accuracy of the operation input detection.

(3) When the door ECU 10 serving as the frequency changing unit determines that external noise is superposed on the sensor output S of the capacitance sensor 5, the door ECU 10 changes the sampling frequency of the capacitance sensor 5. The frequency band of the external noise can be avoided by employing such a configuration. This allows for the execution of highly accurate operation input detection.

(4) When the door ECU 10 serving as the determination condition changing unit and the threshold value changing unit determines that external noise is superposed on the sensor output S of the capacitance sensor 5 even after the sampling frequency is changed, the door ECU 10 raises the wake-up threshold value THw, which is set as the detection threshold value, in order to make the determination condition of the operation input detection stricter. The employment of such a configuration reduces the possibility of external noise causing erroneous recognition. This allows for highly accurate operation input detection. In particular, the use of the wake-up threshold value THw as a detection threshold value reduces wake-ups resulting from erroneously recognized noise (for example, the number of times detection device (not shown) is activated) and saves power.

The above embodiment may be modified as described below.

In the above embodiment, the present invention is applied to the emblem switch 20 that uses the emblem 4 of the vehicle 1, which is arranged on the outer surface 3s of the back door 3, as the operation input unit. The opening drive control is executed on the back door 3 when an operation input performed on the emblem 4 is detected.

Instead, the control content started by the detection of an operation input may be set to any content such as locking and unlocking of a door lock. Further, the control subject does not necessarily have to be the back door 3 and may be, for example, a side door or a hood. In addition, the position of the emblem 4 serving as the operation input unit may be changed to, for example, a position on a hood or a front grille. Moreover, as long as the capacitance sensor 5 is arranged in the operation input unit on the vehicle surface, the operation input unit does not have to be the emblem 4 of the vehicle 1.

The number of samplings (n) that defines the determination section D of the sensor output S of the capacitance sensor S may be set to any value.

Figure 11:
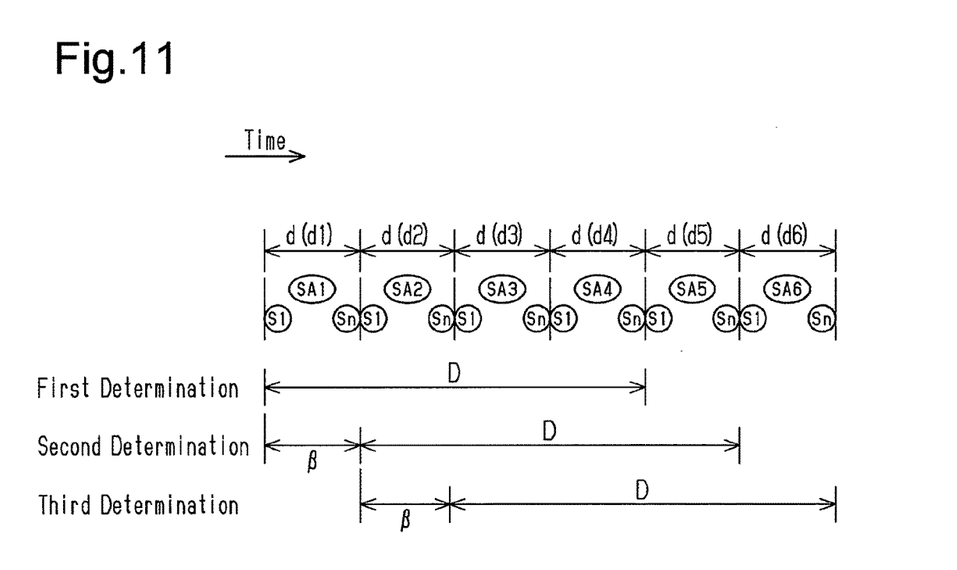
FIG. 11 is a time chart showing a mode of another example of a noise determination.

Further, as shown in FIG. 11, the determination section D includes a plurality of consecutive small determination sections d. A predetermined number of the small determination sections may be used as a unit shift amount $\beta$, and noise determination may be performed while shifting the determination section D by the unit shift amount $\beta$.

For instance, in this example, a single determination section D consist of four consecutive small determination sections d, and the number of the small determination sections d forming the unit shift amount is "1." Accordingly, for example, the small determination sections d1 to d4 are set as a determination section D in a first noise determination, the small determination sections d2 to d5 are set as a determination section D in a second noise determination, and the small determination sections d3 to d6 are set as a determination section D in a third noise determination.

Further, the cumulative value SA of the change amount α in the first noise determination is the sum of the cumulative values of the change amount α in the small determination sections d1 to d4 (SA=SA1+SA2+SA3+SA4). In this case, the initial value S1 of the sensor output S that is first detected in the determination section D is then initial value S1 of the first small determination section d1, and the final value Sn of the sensor output S that is last detected in the determination section D is the final value Sn of the final small determination section d4.

The number of the small determination sections that form the determination section D and the number of the small determination sections that serve as the unit shift amount may be set to any value. The above configuration allows for a highly accurate noise determination while ensuring the continuity of a plurality of determination sections D.

Additionally, the cumulative value SA and the section variation amount ΔS of the change amount α can be calculated for the determination section D by holding the cumulative value SA and the section variation amount ΔS of the change amount α. That is, when the determination section D shifts, the cumulative value SA, the initial value S1, and the final value Sn of the change amount α need to be newly stored (updated) only for the final small determination section d that forms the determination section D. This limits the calculation load and the usage amount of the storage region 10a.

In the above embodiment, the determination condition of the noise determination is that the value obtained by dividing the cumulative value SA of the change amount α in the determination section D by the section variation amount ΔS of the sensor output S (change amount cumulative value section variation amount ratio R) exceeds the predetermined threshold value TH2 (R>TH2) (refer to FIG. 4, step 214). Instead, the determination condition of the noise determination may be that the section variation amount ΔS of the sensor output S is less than or equal to a predetermined threshold value TH3.

Figure 12:
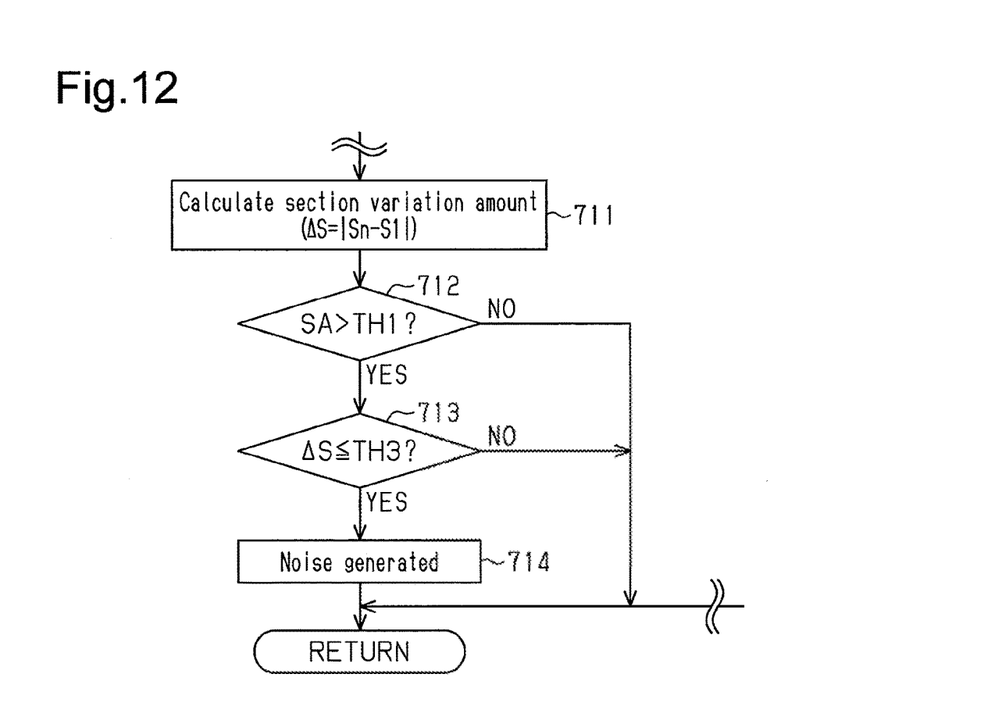
FIG. 12 is a flowchart showing the procedures of a further example of a noise determination.

More specifically, as shown in the flowchart of FIG. 12, the door ECU 10 determines whether or not the cumulative value SA of the change amount α in the determination section D exceeds the predetermined threshold value TH1 (step 712) and determines whether or not the section variation amount ΔS is less than or equal to the predetermined threshold value TH3 (step 713) without calculating the change amount cumulative value section variation amount ratio R. When the cumulative value SA of the change amount α exceeds the predetermined threshold value TH1 (SA>TH1, step 712: YES) and the section variation amount ΔS is less than or equal to the predetermined threshold value TH3 (ΔS≤TH3, step 713: YES), external noise is determined as being superposed on the sensor output S of the capacitance sensor 5 (step 714).

Each of the processes of steps 701 to 710, 715, and 716 in this example may be executed in the same manner as each of the processes of steps 201 to 210, 216, and 217 in the flowchart of FIG. 5. In such a configuration, the same advantage as the above embodiment is obtained.

In the above embodiment, when determined that external noise is superposed on the sensor output S of the capacitance sensor 5, the execution of an operation input detection on the emblem 4 serving as the operation input unit is first prohibited. Then, the frequency change control and the detection threshold value change control are executed in the state in which the operation input detection remains prohibited. Instead, when the execution of the frequency change control does not eliminate external noise, the prohibition of the operation input detection may be canceled to shift to the detection threshold value change control. The frequency change control may be executed without prohibiting the execution of the operation input detection.

In addition, the detection threshold value change control may be performed instead of the frequency change control. The execution of the operation input detection may be prohibited without executing the detection threshold value change control when external noise is not eliminated even after the frequency change control is executed.

In the above embodiment, the number of times the sampling frequency is raised in the frequency change control (Xn) and the number of times the detection threshold value is raised in the detection threshold value change control (Yn) may be one or three or more. The changing of the sampling frequency may be executed by lowering the sampling frequency.

In the above embodiment, the wake-up threshold value THw set as the detection threshold value is raised to make the determination condition of operation input detection stricter. Instead, the strict determination condition control only needs to make the determination condition of the operation input detection stricter, for example, when changing other detection on threshold values.

The technical concept that can be understood from each of the above embodiments will now be described together with the advantage.

(A) A noise determination device for a capacitance sensor is provided. The noise determination device includes an operation input detection unit that detects an operation input performed on an operation input unit, which is arranged on a vehicle surface, based an a sensor output of a capacitance sensor that changes when a detection subject moves toward and away from the operation input unit, a change amount accumulation unit that accumulates a change amount of the sensor output in a determination section during which sampling is performed for a predetermined number of times on the sensor output of the capacitance sensor, wherein the change amount of the sensor output is a difference of a detection value of the sensor output detected at each sampling timing from a previous value of the sensor output, a section variation amount calculating unit that calculates a section variation amount of the sensor output that is a difference of an initial value of the sensor output that is first detected in the determination section and a final value of the sensor output that is last detected in the determination section; and a noise determination unit that determines that external noise is superposed on the sensor output when a cumulative value of the change amount exceeds a predetermined threshold value and a value obtained by dividing the cumulative value of the change amount by the section variation amount exceeds a predetermined threshold value. This allows the operation input detection device to accurately determine whether or not external noise is superposed on the sensor output S of the capacitance sensor 5 while limiting increases in the calculation load.

The invention claimed is:

1. An operation input detection device comprising:
   an operation input detection unit that detects an operation input performed on an operation input unit, which is arranged on a vehicle surface, based on a sensor output of a capacitance sensor that changes when a detection subject moves toward and away from the operation input unit;
   a change amount accumulation unit that accumulates a change amount of the sensor output in a determination section during which sampling is performed for a predetermined number of times on the sensor output of the capacitance sensor, wherein the change amount of the sensor output is a difference of a detection value of the sensor output detected at each sampling timing from a previous value of the sensor output;
   a section variation amount calculating unit that calculates a section variation amount of the sensor output that is a difference of an initial value of the sensor output that is first detected in the determination section and a final value of the sensor output that is last detected in the determination section; and
   a noise determination unit that determines that external noise is superposed on the sensor output when a cumulative value of the change amount exceeds a first threshold value and a value obtained by dividing the cumulative value of the change amount by the section variation amount exceeds a second threshold value.

2. The operation input detection device according to claim 1, wherein
   the determination section includes a plurality of consecutive small determination sections, and
   the noise determination unit uses a predetermined number of the small determination sections as a unit shift amount and is configured to shift the determination section by the unit shift amount.

3. The operation input detection device according to claim 1, comprising a frequency changing unit configured to change a sampling frequency of the capacitance sensor when determined that external noise is superposed on the sensor output.

4. The operation input detection device according to claim 3, comprising a determination condition changing unit configured to make a determination condition of the operation input stricter when determined that the external noise is superposed on the sensor output even after the sampling frequency is changed.

5. The operation input detection device according to claim 4, wherein
   the operation input detection unit is configured to detect an operation input on the operation input unit under the condition that the sensor output exceeds a predetermined detection threshold value, and
   the determination condition changing unit makes the determination condition stricter to raise the detection threshold value.

6. The operation input detection device according to claim 5, wherein the detection threshold value is a wake-up threshold value.

7. The operation input detection device according to claim 1, comprising a determination condition changing unit configured to make a determination condition of the operation input stricter when determined that the external noise is superposed on the sensor output.

8. The operation input detection device according to claim 1, comprising an input detection prohibiting unit configured to prohibit detection of the operation input when determined that external noise is superposed on the sensor output.

9. An operation input detection device comprising:
   an operation input detection unit that detects an operation input performed on an operation input unit, which is arranged on a vehicle surface, based on a sensor output of a capacitance sensor that changes when a detection subject moves toward and away from the operation input unit;
   a change amount accumulation unit that accumulates a change amount of the sensor output in a determination section during which sampling is performed for a predetermined number of times on the sensor output of the capacitance sensor, wherein the change amount of the sensor output is a difference of a detection value of the sensor output detected at each sampling timing from a previous value of the sensor output;
   a section variation amount calculating unit that calculates a section variation amount of the sensor output that is a difference of an initial value of the sensor output that is first detected in the determination section and a final value of the sensor output that is last detected in the determination section; and
   a noise determination unit that determines that external noise is superposed on the sensor output when a cumulative value of the change amount exceeds a first threshold value and the section variation amount is less than or equal to a second threshold value.

10. The operation input detection device according to claim 9, wherein
    the determination section includes a plurality of consecutive small determination sections, and
    the noise determination unit uses a predetermined number of the small determination sections as a unit shift amount and is configured to shift the determination section by the unit shift amount.

11. The operation input detection device according to claim 9, comprising a frequency changing unit configured to change a sampling frequency of the capacitance sensor when determined that external noise is superposed on the sensor output.

12. The operation input detection device according to claim 11, comprising a determination condition changing unit configured to make a determination condition of the operation input stricter when determined that the external noise is superposed on the sensor output even after the sampling frequency is changed.

13. The operation input detection device according to claim 12, wherein
    the operation input detection unit is configured to detect an operation input on the operation input unit under the condition that the sensor output exceeds a predetermined detection threshold value, and
    the determination condition changing unit makes the determination condition stricter to raise the detection threshold value.

14. The operation input detection device according to claim 13, wherein the detection threshold value is a wake-up threshold value.

15. The operation input detection device according to claim 9, comprising a determination condition changing unit configured to make a determination condition of the operation input stricter when determined that the external noise is superposed on the sensor output.

16. The operation input detection device according to claim 9, comprising an input detection prohibiting unit configured to prohibit detection of the operation input when determined that external noise is superposed on the sensor output.

* * * * *